(12) United States Patent
Carner et al.

(10) Patent No.: US 6,622,925 B2
(45) Date of Patent: Sep. 23, 2003

(54) APPARATUS AND METHOD FOR WIRELESS CONTROL

(75) Inventors: Gary A. Carner, Jamesville, NY (US); Bradley J. Hesse, Dewitt, NY (US); Kurt V. Schultz, Dewitt, NY (US)

(73) Assignee: Enernet Corporation, Dewitt, NY (US)

( * ) Notice: Subject to any disclaimer, the term of this patent is extended or adjusted under 35 U.S.C. 154(b) by 0 days.

(21) Appl. No.: 09/972,798

(22) Filed: Oct. 5, 2001

(65) Prior Publication Data

US 2003/0066897 A1 Apr. 10, 2003

(51) Int. Cl.[7] .......................... G05D 23/00; G01M 1/38
(52) U.S. Cl. ...................... 236/46 R; 236/51; 165/209; 700/278
(58) Field of Search ....................... 700/276, 278–11; 236/46 R, 51, 94; 165/209

(56) References Cited

U.S. PATENT DOCUMENTS

| 4,433,719 A | 2/1984 | Cherry et al. ............. 236/51 X |
| 4,506,827 A | 3/1985 | Jamieson et al. ......... 236/46 R |
| 5,203,497 A * | 4/1993 | Ratz et al. ................ 236/46 R |
| 5,224,648 A | 7/1993 | Simon, deceased et al. .. 236/51 |
| 5,341,988 A | 8/1994 | Rein et al. ................ 236/49.3 |
| 5,390,206 A | 2/1995 | Rein et al. ............. 236/49.3 X |
| 5,419,489 A | 5/1995 | Burd ........................... 236/47 |
| 5,711,480 A | 1/1998 | Zepke et al. .................. 236/51 |
| 5,839,654 A | 11/1998 | Weber .......................... 236/47 |
| 5,926,776 A | 7/1999 | Glorioso et al. ............ 702/130 |
| 5,927,599 A | 7/1999 | Kath ............................ 236/47 |
| 6,124,806 A | 9/2000 | Cunningham et al. . 340/870.02 |
| 6,152,375 A | 11/2000 | Robison |
| 6,216,956 B1 | 4/2001 | Ehlers et al. .................. 236/47 |
| 6,220,518 B1 | 4/2001 | Kline et al. ................ 236/49.3 |
| 6,236,953 B1 | 5/2001 | Segal .......................... 702/127 |
| 6,237,854 B1 | 5/2001 | Avni ............................ 236/51 |
| 6,254,009 B1 | 7/2001 | Proffitt et al. |
| 6,460,356 B1 * | 10/2002 | Tao et al. ..................... 62/175 |

* cited by examiner

Primary Examiner—William Wayner
(74) Attorney, Agent, or Firm—Bond, Schoeneck & King, PLLC

(57) ABSTRACT

A control apparatus includes a power supply for providing appropriate current and voltage to modules of the control apparatus. A user interface microprocessor module provides the necessary architecture to handle user inputs as well as programmable control logic. Furthermore, there is a communications microprocessor module initiating data traffic signals among all control apparatus modules through a wireless transceiver module. Finally, a remote control node module through a transceiver interprets and acts upon wireless traffic signals to control an operation.

A method of operating a control apparatus where the user operates the apparatus by energizing a power supply for providing appropriate current and voltage to modules of the control apparatus. The user interacts with a user interface microprocessor module that provides the necessary architecture to handle user inputs as well as programmable control logic. The user interface microprocessors begins commanding a communications microprocessor module that provides data traffic signals among the control apparatus modules. Two or more transceivers, one at the remote control node(s) exchange wireless data traffic signals to control an operation.

76 Claims, 11 Drawing Sheets

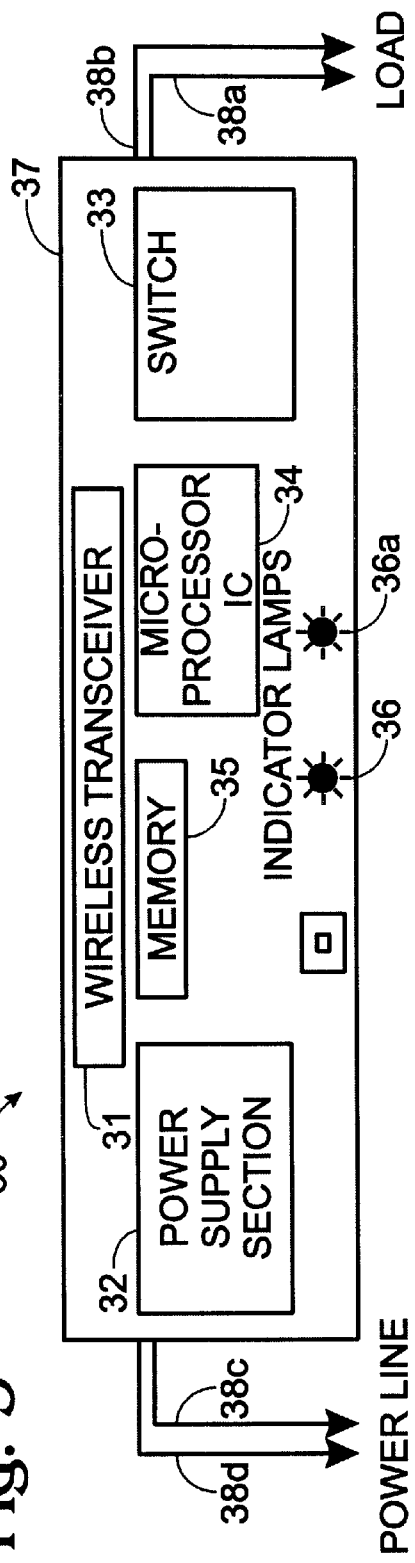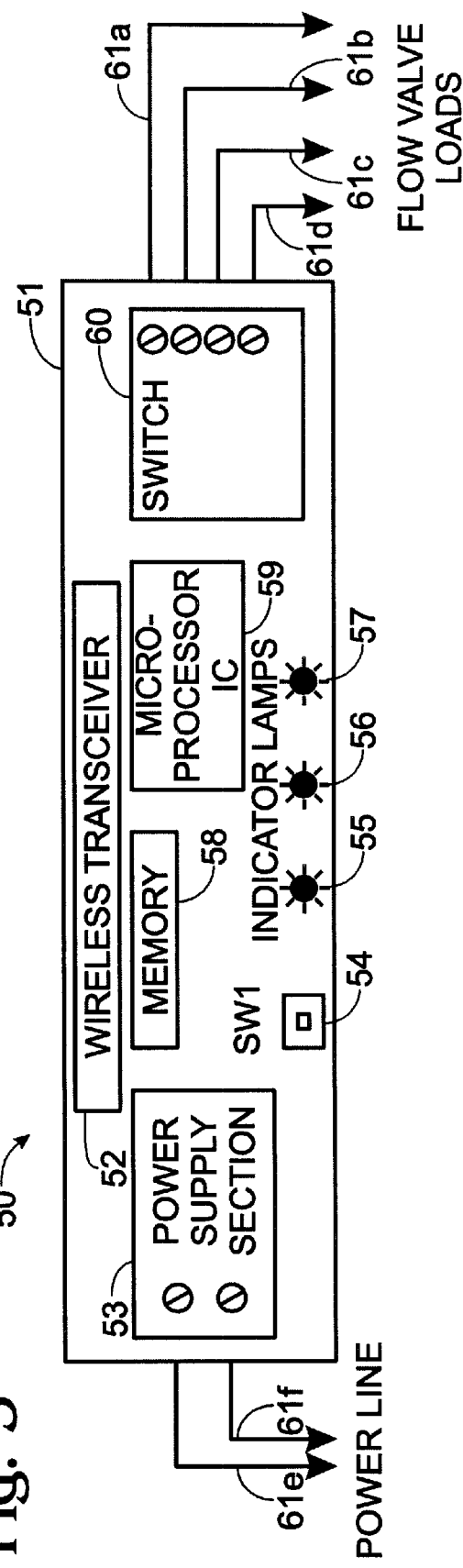

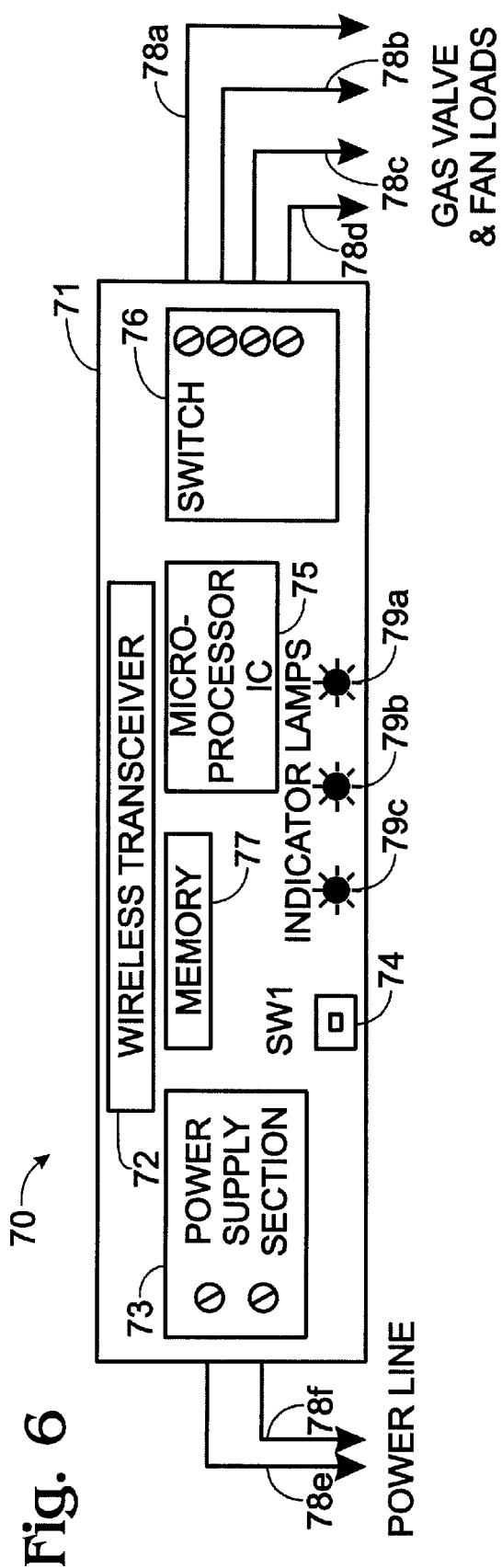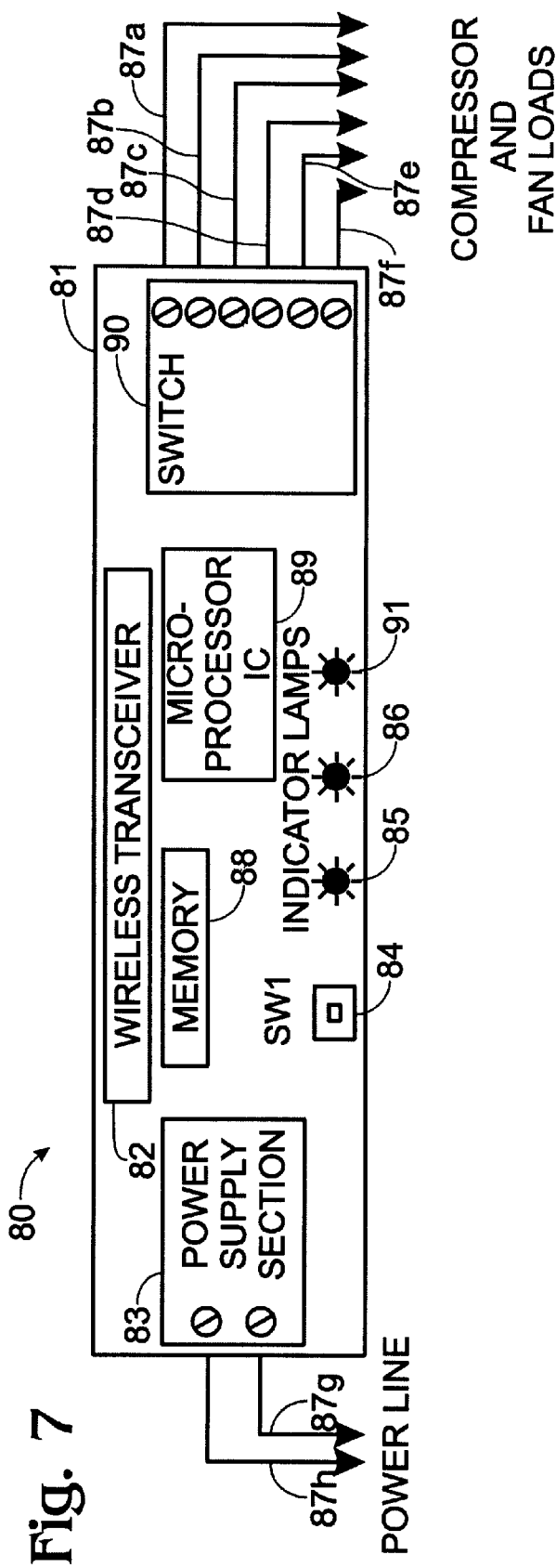

APPARATUS AND METHOD FOR WIRELESS CONTROL

FIELD OF THE INVENTION

The present invention relates to a control method and apparatus, and more particularly, to a wireless control method and apparatus, which are used, for example, in controlling HVAC equipment, controlling the flow of fluids or gases, controlling rates of different objects, controlling pressure, controlling temperature, or the like.

BACKGROUND OF THE INVENTION

In temperature comfort control, older systems utilize a passive non-powered thermostat that usually includes a bi-metal element or coil. The thermostat senses the temperature within a space, and that co-acts with an electrical contact coupled to a two-wire control line that commands the heating or cooling function of a particular comfort conditioner. A manual actuator is provided for setting the desired temperature to be maintained. The control operates because changes in the length of the bi-metal element will cause the contact to either separate or electrically connect the wires comprising the control line. This energizes or disables the controller that operates the heating or cooling system.

The use of baseboard electric heat that is equipped with an integral bi-metal thermostat control, and portable air conditioners, are prevalent in vintage construction. For example, in subsidized multi-family housing where the initial cost was of primary concern, bi-metal thermostats are used. Also, inefficient portable air conditioners are placed in windows or walls. These controls are imprecise and are typically located at the point of heating or cooling. Furthermore, they are difficult to regulate and a nuisance to adjust. Consequently, their thermostats are set and left in a relatively high demand for heating or cooling. It is common for occupants to open windows for controlling comfort level where electric baseboard heating is used.

There are several disadvantages to comfort control systems using mechanical thermostats. For example, despite the use of anticipator devices, such thermostats have uncomfortable deadbands. The placement of the thermostats, if not in the heater or air conditioning (AC) unit, is based on the inconvenience of the permanent wiring rather than on the location to be controlled. Furthermore, there is no provision for automatic setback for comfort or energy saving.

Previous studies by the Electric Power Research Institute, and others, have shown that as much as 30% savings can be obtained through full-featured precision programmable line-voltage thermostats instead of using bi-metal controls. However, retrofitting to wall mounted line-voltage thermostats requires hard-wired connections to each baseboard heating element or portable air conditioner. To accomplish this, significant renovations are required to install new wiring, or wire molding must be surface-mounted along floorboards, around doorways, and around windows to enclose the wire. Also, the new thermostats typically need to be located at the farthest location away from the electric baseboard and air conditioner for the control to properly regulate the room temperature. Consequently, retrofitting typically is not considered.

In newer temperature control systems, digital circuitry and/or microprocessor integrated circuits (ICs) allow thermostats, requiring electrical power for their operation, to provide computational and control functions. Furthermore, some digital thermostats permit user-programming, allowing, for example, temperature set-back when a cooler or warmer temperature can be maintained instead of one temperature. However, the cost of retrofitting existing buildings is expensive and generally retrofitting is not considered.

The use of wireless control of a portable air conditioner or portable electric space heater also includes a portable thermostat combined with a control signal transmitter that is placed on a table, desk or stand. This maintains a uniform level of air temperature comfort in the portion of the room where the thermostat is located. A wireless control receiver that is responsive to the transmitted control signal is included as a portion of a plug-in-adapter module and plugs directly into a power wall receptacle. An ordinary window air conditioner or portable space heater is then plugged into the adapter module providing on and off control. However, this embodiment uses a temperature anticipator method of control and does not efficiently control temperature where used and is only local-zone-ambient-temperature responsive. This system anticipates shutting down in the event of absence of wireless control signals. However, shutting down could cause complete and potentially harmful loss of space temperature control resulting in freezing pipes, or an unsuitable temperature environment. Furthermore, the components of this system can be misplaced or stolen because they are not permanently attached. It is not intended to retrofit hard-wired electric baseboard heaters or air conditioners but only plug-and-cord connected equipment. Finally, the thermostat is intended for connection to only one comfort conditioner at a time and will not automatically operate both heating and cooling loads as required.

New applications and growth of data networking have created unforeseen demands and opportunities for temperature control apparatus and methodology. The need for real-time information is critical to the efficient operation of many industries. For example, the utility industries, because of deregulation and increased competition, demands increased efficiencies in the utility systems. These increased efficiencies require better information and control and heightens the need for near real-time monitoring. One such solution uses a wide-area remote telemetry system which monitors and controls remote devices by means of an information control system. The system uses a sensor interface module that constantly monitor devices for triggering events. The sensor interface modules transmit information to at least one data collection modules that gathers, processes, stores and transmits information via external communications. The host module receives, records, processes, and transmits information to the network. The information may then be transmitted to the user as desired. However, this system does not respond to changes and automatically make those changes to efficiently operate a process. User intervention is required to make adjustments to the process to have it operate in response to those changes.

What is needed is a control apparatus that is permanently affixed to its location and does not require an expensive retrofit because of hard wiring. What is further needed is a control apparatus that controls by proportional integral differential measuring elapse of time for real-time control to increase efficiency of systems. Also, what is needed is a control apparatus that provides precision control from a single sensor to many devices providing efficient equipment control. Finally, what is needed is an innovative control solution to effectively address the needs of energy conservation and demand control, specifically, performance contracting retrofit temperature control opportunities, and temperature or duty cycle based load curtailment.

SUMMARY OF THE INVENTION

One aspect of the claimed invention is to control by a proportional integral differential, measuring elapse of time for real-time control, to increase accuracy and efficiency of systems.

Another aspect of the claimed invention is to permanently affix it to its location so that hard-wired retrofits are not required.

It is another aspect of the claimed invention to provide precision control of unrelated comfort conditioning equipment such as window air conditioners and electric heat.

It is still another aspect of the claimed invention to provide a gateway interface to external data networks for various purposes including demand control.

It is yet another aspect of the claimed invention to provide control through inclusion of an intelligent processing control algorithm, and two-way wireless communication for passing parametric data between the sensor and actuator device.

It is still another aspect of the claimed invention to provide third-party supervisory control and monitoring through a wireless microprocessor system allowing building-area-network capability through a store-and-forward repeater protocol.

It is yet still another aspect of the claimed invention to ensure several independent installations co-located in a small area that do not mutually interfere due to their common wireless communication channel.

A control apparatus includes a power supply for providing appropriate current and voltage to modules of the control apparatus. A user interface microprocessor module provides the necessary architecture to process user inputs as well as programmable control logic. Furthermore, there is a communications microprocessor module initiating data traffic signals among all control apparatus modules through a wireless transceiver module. Finally, a remote control node module, through a transceiver, interprets and acts upon wireless traffic signals to control an operation.

A method of operating a control apparatus includes the user operating the apparatus by energizing a power supply for providing appropriate current and voltage to modules of the control apparatus. The user interacts with a user interface microprocessor module that provides the necessary architecture to handle user inputs as well as programmable control logic. The user interface microprocessors begin commanding a communications microprocessor module that provides data traffic signals among the control apparatus modules. Two or more transceivers, one at the remote control node(s), exchange wireless data traffic signals to control an operation.

These and other aspects of the claimed invention will become apparent from the following description, the description being used to illustrate a preferred embodiment of the claimed invention when read in conjunction with the accompanying drawings.

BRIEF DESCRIPTION OF THE DRAWINGS

FIG. 3 shows the basic receiver control node architecture for baseboard electric heat.

FIG. 5 shows the hydronic remote control node.

FIG. 6 shows gas heating remote control node.

FIG. 7 shows a packaged terminal air conditioner remote control node.

DETAILED DESCRIPTION OF THE INVENTION

Figure 1:
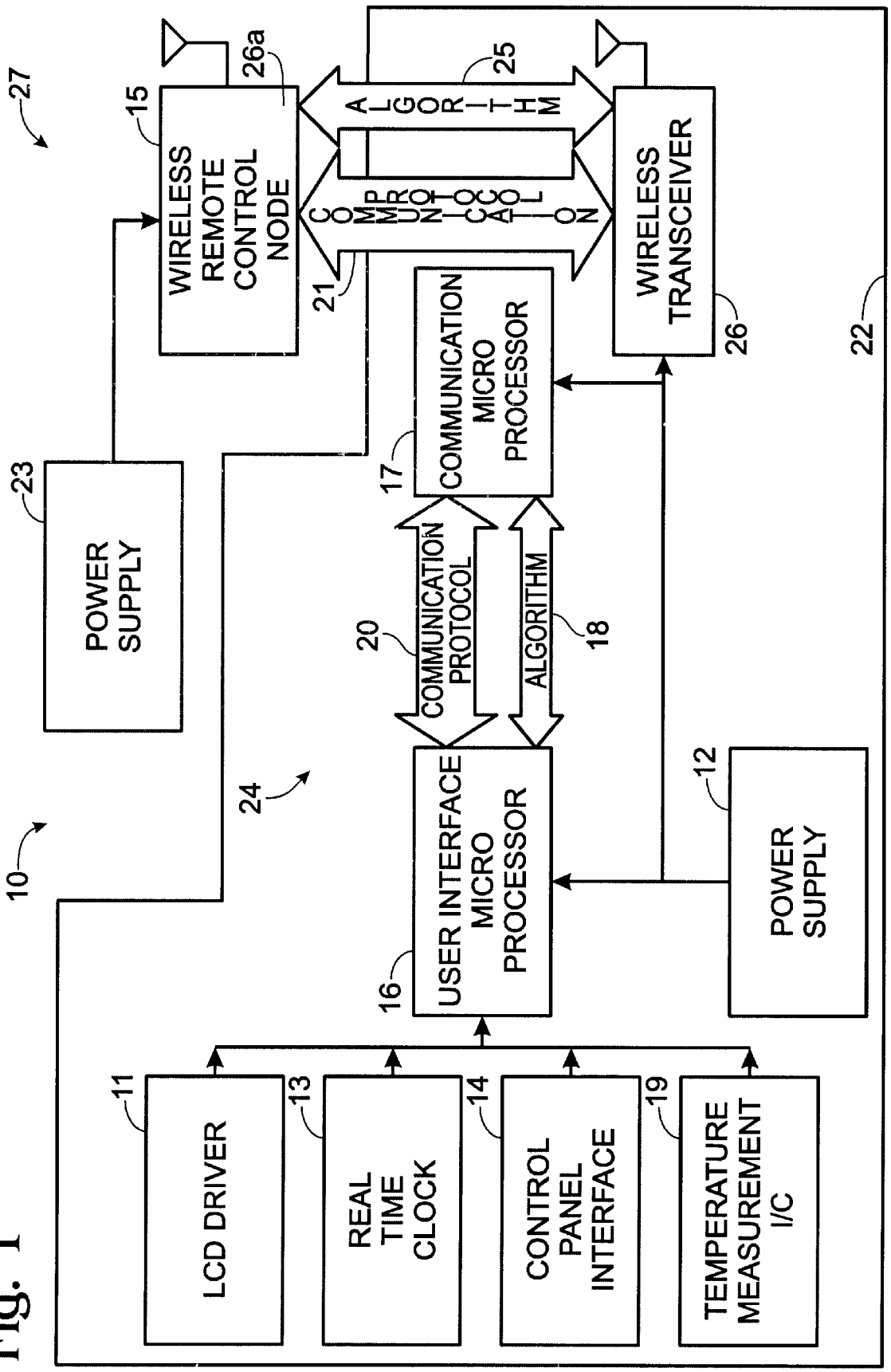
FIG. 1 is a wireless thermostat design block diagram with no external network.

While the claimed invention is described below with reference to heating, ventilating, and air conditioning, a practitioner in the art will recognize the principles of the claimed invention are applicable to other applications as discussed supra.

To effectively address the needs of ever advancing energy conservation and demand control efforts, specifically, performance contracting retrofit temperature control opportunities, and utility load curtailment programs, an innovative control solution is required. Now referring to FIG. 1, system 10 is a wireless design that includes a wireless thermostat control apparatus 22 and a remote control node apparatus 27. The wireless thermostat apparatus 22 is a precision wireless thermostat control that allows installation at any location where none previously existed without labor-intensive wiring. The remote control node apparatus 27 receives commands from the thermostat 22 that controls comfort conditioning equipment. The wireless thermostat design is developed around existing industry standard control network protocol specification, American National Standards Institute/Engineering Industry Association, (ANSI/EIA) 709.1-A-1999. Its wireless data traffic signals can be routed onto conventional communications channels such as wide area networks (WAN), local area networks (LAN), radio or telephone. For example, a utility could, via radio, telephone, or optic fiber provide a load shedding signal to a building. The load shed signal could be a simple OFF command for a specified period of time or a more sophisticated temperature change command to the wireless thermostat system 10 that adjusts the temperature set point up or down. The utility signal could then be propagated throughout the building by a building area network process and acted upon. Advanced warning of load shedding could also be sent to tenants and displayed at their thermostats. Load shedding history files or power usage and operational history of heating and air conditioning loads could be kept by a network data acquisition node. The utility, from a single point on the network, could later access that data through a conventional communications channel or network like radio frequency, power-line-carrier, optics, acoustics, twisted pair or some combination. The wireless thermostat system 10 is a local wireless thermostat system and a base from which to expand communication and control.

The wireless thermostat system 10 consists of several modules including a user interface microprocessor (UIP) 16 and a communication microprocessor (CP) 17 that communicate with each other through a first (interprocessor communication) protocol 20 and execute control algorithm 18. The communication processor 17 further communicates through a second communication protocol 21, by the way of a first wireless transceiver 26, to a wireless remote control node apparatus (RCN) 27 that includes a remote control node processor 15 energized by a second power supply 23. The RCN 27 contains a second wireless transceiver 26a that communicates back and forth with the first transceiver 26. The user interface processor 16 includes an LCD driver 11, a real time clock 13, a control panel interface, 14, and a temperature measurement sensor integrated circuit (IC) 19. The UIP 16 and CP 17 are energized by a first power supply 12. The wireless thermostat system 10 consists of a wall-mounted thermostat 22 that includes the UIP 16 and the CP 17, linked by a first wireless transceiver 26 to one or more RCN apparatuses 27. The thermostat 22 provides user interface while the remote control node processor 15 provides the power and/or control interface to the heating, ventilation and air conditioning (HVAC) equipment being controlled. Finally, the wireless thermostat 22 can be mounted in any location because it is battery operated.

In the preferred embodiment of the invention, system 10, in FIG. 1, consists of a wireless thermostat 22 linked by way of a wireless communication channel, using a second communication protocol 21, to a single RCN apparatus 27 or multiple RCNs. The wireless thermostat 22 and RCN 15 execute a second control algorithm 25. One RCN 27 would control a single comfort conditioning appliance, like a baseboard electric heater or a window-mounted air conditioner. Furthermore, the wireless thermostat 22 linked to multiple RCNs would provide comfort conditioning to separate areas of a building, or to a single building space having a number of separate conditioning appliances.

Several RCN 27 apparatus are each suited to the specific comfort conditioning appliance they are intended to control. For example, one RCN 27 is equipped with a single electronic switch used for direct on/off control of a single 120 VAC plug load. Packaged in a wall plug enclosure, this design is used to control a window air conditioner unit or other plug-in comfort conditioner such as a space heater. Furthermore, a packaged terminal air conditioner model may provide on/off control drive of heating, cooling and fan loads. In another embodiment the RCN 27 is designed to control valves in hydronic systems. Other RCN applications are possible to operate any control device.

In FIG. 1, system 10 is a wireless thermostat 22 and remote control node(s) 27 that allows installation at any location. The wireless thermostat 22 is comparable in size to a typical full-featured multi-staged thermostat used in heating and cooling applications. The dual processor design 24 includes a user interface microprocessor (UIP) 16 and a communication processor (CP) 17. The UIP 16 and CP 17 exchange data and control signals through a first communication protocol 20 that allows the execution of a first complex control algorithm 18. The main functions are user interface, control and communication. The dual processor design 24 allows the UIP 16 and CP 17 to independently function and perform tasks that are geared towards their respective strengths.

The CP 17 may be a Toshiba TMPN3120FE5M integrated circuit (IC). The CP 17 transparently implements a robust control network protocol specification as described in American National Standards Institute/Engineering Industry Association (ANSI/EIA) 709.1-A-1999. The Toshiba IC is designed specifically for applications where communication capability and flexibility in the user function are required. A practitioner in the art will readily understand that with regard to control algorithm 18, custom firmware written for the CP 17 responds to commands issued from the UIP 16. This CP will initiate thermostat and remote control node network binding, and communicate data messages between the thermostat and one or more remote control nodes controlling the HVAC equipment. The CP 17 shares a crystal real time clock 13 and reset circuitry control panel interface 14 with the UIP 16. Furthermore, the CP may be a plurality of other designed integrated circuits depending upon user requirements and application.

The user interface microprocessor (UIP) 16 circuit contains a stored-program micro-controller IC responsible for a number of functions. The UIP 16 formats and presents environment and status information through a liquid crystal diode (LCD) drive 11 display. It accepts and interprets user commands from a pushbutton keypad in the control panel interface 14. In the preferred embodiment the UIP 16 reads and processes raw temperature information from the temperature sensor and the temperature measurement IC 19. Furthermore, the UIP 16 implements a portion of the first (inter-processor) communications protocol 20 that is responsible for error-free data transmission to the CP 17, implements a portion of the second communication protocol 21 to the connected remote control node processor(s) 15, and implements a portion of the software control algorithm 18 that provides accurate control of building space temperature. Also, a second (safety) algorithm 25 is implemented at the remote control node processor 15. Finally, the UIP 16 implements the real-time clock 13 used for setback programming, and manages the wireless thermostat 22 power consumption that optimizes battery life.

The ambient-light-assisted power supply 12 of the wireless thermostat 22 may use a plurality of sources including, but not limited to, solar, battery or line voltage. However, in the preferred embodiment the power supply 12 is a battery, including but not limited to, two (2), 1.5 volt, lithium AA cells. Another source may be a photovoltaic, 3.6 volt, eight amorphous cells. The eight-cell PV array sources about 40 to 50 uA at 3.0 volts. With sufficient ambient lighting, a photovoltaic cell array provides opportunistic power with sufficient power to operate the thermostat during microprocessor "sleep" periods. Typically, a combination of battery and photovoltaic cells are used. The combination, along with power management techniques will provide a battery life of about 1 to 3 years. Furthermore, the second power supply 23 can be the same as that of the first power supply 12. Also, the first and second power supply can be line AC voltage or standard 24 volt control voltage with the appropriate DC conversion circuit.

The wireless thermostat 22 includes a first wireless transceiver 26 that is modular and communicates with a remote control node processor 15 with a second wireless transceiver 26a that is modular and a part of the RCN apparatus 27. The wireless transceiver is directly responsible for propagating data communications signals over the communications channel using the second communication protocol 21. The preferred embodiment is a RF Monolithics, Inc., RF transceiver IC with associated support circuitry and a ¼ wave monopole antenna. The operating frequency is 916.5 MHz that operates under unlicensed FCC part 15 rules. A practitioner in the art will appreciate that the RF emission characteristics may vary depending upon communications requirements and whether the user, wants to or not to, obtain Federal Communication Commissioning licensing. This includes but is not limited to operating frequency, modulation mode, and transmitter power. A practitioner in the art will further understand that the wireless thermostat system 10 is a wireless thermostat system and can be accessed by a third party through existing communications channels like radio frequency (RF), power-line carrier, twisted pair, optical, acoustical, or some other combination.

The wireless thermostat apparatus 10, as shown in FIG. 1, generally consists of two or more physical components. The wireless thermostat 22 is a battery operated wall mounted thermostat with a first wireless transceiver 26 logically linked by discrete address, to one or more receiver control node apparatuses (RCN) 27 components that are also equipped with a second wireless transceiver 26a. The RCN 27 component provides the physical interface to the heating, ventilation and air conditioning equipment being controlled and the wireless thermostat 22 provides the interface link to the user.

While the wireless thermostat system 10 first controls heating, ventilation, and air conditioning (HVAC) equipment confined to a room, apartment, or building zone, the technology provides building-wide communication through a store-and-forward repeater protocol. The extended wireless range is provided when nodes (RCNs thermostats and repeaters) retransmit data traffic messages intended for other nodes or in the case of a global message or command intended for all nodes. In store-and-forward messaging, commands can ripple through a building communicating from node to node. The final receiving nodes can be significant distances from the originating source. Furthermore, messages can be routed to another communications medium such as optics and acoustics. For example, building AC power can be used as a network communication medium through a technology known to practitioners in the art as Power-Line-Carrier (PLC). Furthermore, global network commands could be issued that all nodes respond to.

The wireless thermostat 22 is comparable in size to a typical full-featured multi-staged thermostat used in heating and cooling applications. The display is large and easily read with the clock, the present space temperature, the desired set point temperature, and other functional status information displayed. A large user-friendly control panel allows UP/DOWN adjustment of temperature, setting of the clock, and programming set back temperatures. The display may be an LCD, touch screen, and can be adapted to read remotely on a larger CRT monitor. The display provides mode status, fan status, stage, load control, preprogram select, program period, temperature, clock, battery status, wireless link status, and ambient power status.

A large, user friendly, pushbutton-based control panel 14 allows adjustment of the many operating modes. Another embodiment may have a touch screen display integral with control panel 14. This eliminates the separate pushbutton control panel 14. The wireless thermostat 22 control panel 14 push button functions include, but are not limited to, set clock, program, setup, enter, up, down, network and fan. Pressing the set clock button once activates it and the hour digits of the clock will flash. The user may then push the UP or DOWN buttons to change the hour. Pressing the set clock button again activates the minute digits of the clock and they will flash. The user may then push the UP or DOWN buttons to change the minutes. Pressing ENTER at any time will put the thermostat back in the normal mode. Pressing PROGRAM will put the thermostat in a program mode. Pressing SETUP allows the user to logically bind receiver control nodes (RCNs). Pressing NETWORK initiates network communications. Finally, if the system is used for heating and cooling where a fan is used, the fan button can turn the fan on or put the fan into automatic run mode.

The wireless thermostat 22 temperature is measured using a serial interfaced temperature sensor integrated circuit (IC) 19. This IC responds to UIP control processor commands. Also, a real-time clock 13 IC permits the thermostat to have programmable schedules. However, clock accuracy is a function of the crystal accuracy. There are numerous crystals that can be used with the thermostat but each has differing accuracies.

Figure 2:
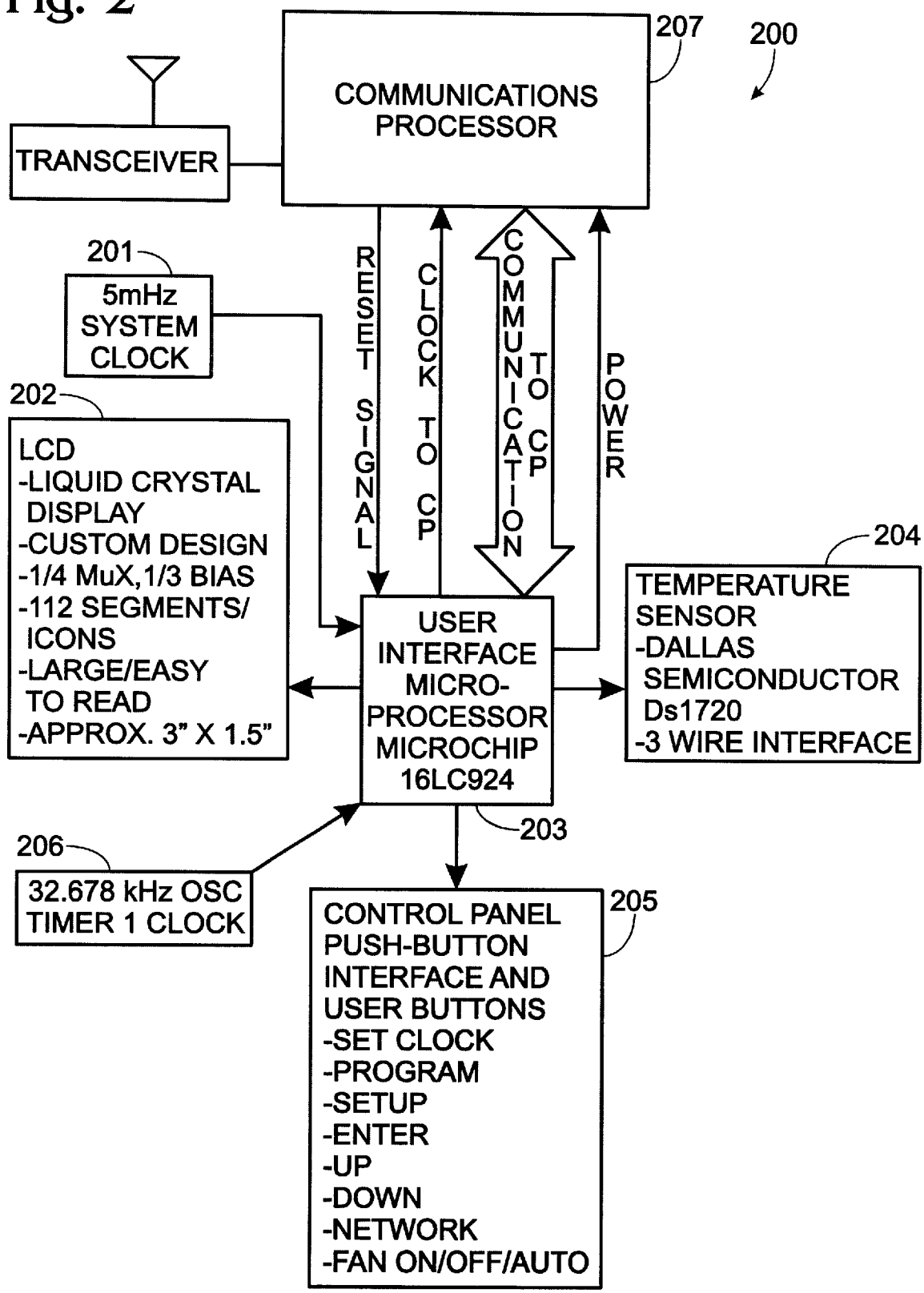
FIG. 2 is a block diagram of the user interface microprocessor.

In FIG. 2, block diagram 200 shows the user interface microprocessor (UIP) 203. The UIP uses a 32.678 kHz oscillating timer1 clock 206 and a 5.0 MHz system clock 201. The UIP provides the necessary architecture for recognizing the control panel, implementing temperature measurement 204, implementing the real-time clock 201, implementing the LCD driver 202, and implementing the programmable thermostat algorithm 18, as shown in FIG. 1. The UIP 203 issues commands to the communications processor 207, generates processor clock 206 signals, and provides power to the CP 207. The UIP 203 functions as the master or control processor to the CP 207, waking or powering it at the appropriate times. Furthermore, the UIP 203 initiates data transfers between the thermostat and its respective remote control nodes. The UIP 203 may be a Microchip 16LC924 processor or any compatible microprocessor.

The UIP 203 interfaces the wireless thermostat control panel 205. This includes set clock, program, setup, enter, up and down, network, and fan on-off or automatic. Also, the UIP 203 interfaces the wireless thermostat liquid crystal display (LCD) 202 that may be a custom design, but has large easy to read icons displayed. Finally, the UIP interfaces the wireless thermostat temperature sensor 201 that may be a plurality of sensors including Dallas Semiconductor, Model DS1720 with 3-wire interface. However, the UIP 203 can interface with other sensors such as, including but not limited to, pressure, flow, rate, volume, magnetic, proximity, light, sound, vibration, density, electrical, and the like. A practitioner in the art will readily see that the UIP and CP arrangement can be modified and made to work in many different applications. For example, a user might want to control the flow of fluids or gases in a process. In industrial applications, a wireless flow transmitter could be installed to control different receiver control nodes that are used to adjust flow control valves. In another application a wireless rate transmitter could be installed to control the rate at which parts move down a conveyor.

The UIP 203 and CP 207 intercommunicate through a dedicated input/output (I/O) ports. Two of these control port signals are dedicated to supporting a bi-directional serial data stream whose physical layer protocol is compatible with an industry standard for multi-platform communications, for example, SPI by Motorola and Microwire by National Semiconductor. Two additional control signals are provided to supplement the bi-directional data port. The CP 207 and RF transceiver consume more power than the UIP 203. Consequently, the CP 207 and RF transceiver spend most of the time powered off, awakened only when commanded by the UIP 203. The CP 203 is essentially a slave processor, and takes no independent action unless directed by the UIP 203. This structured activity results in the lowest overall power consumption by the wireless thermostat and serves to eliminate potential contention issues prevalent in multi-processor environments.

Figure 10:
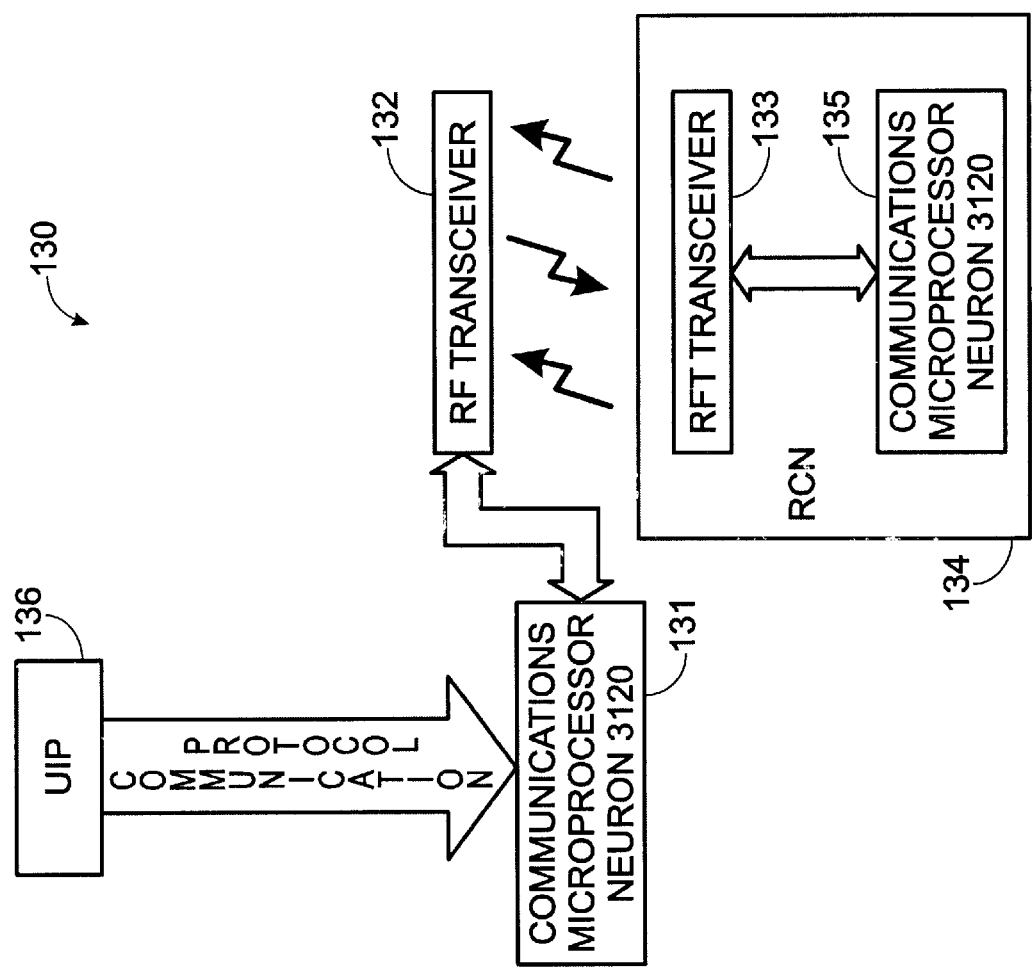
FIG. 10 is a block diagram of a communications scenario.

There are several RCN apparatuses, as shown in FIGS. 3 through 8, with each designed for a particular HVAC application. The wireless thermostat design as shown in FIG. 1 allows new receiver control nodes to be implemented through a customized control algorithm, as shown in FIG. 10, control network protocol specification ANSI/EIA 709.1-A-1999, and wireless data transceiver.

In FIG. 3, apparatus 30 is a baseboard electric heat remote control node. The construction is a small ABS junction box 37. It contains off-line capacitive 120/240 VAC power supply 32, a wireless data transceiver 31, a memory module 35, an electric switching element 33, a microprocessor IC 34, and pigtail flying leads 38a, 38b, 38c, 38d for wire-nut connections. Indicator lamps 36 and 36a show the status of the apparatus 30 in connection with the wireless thermostat. For example, first lamp 36 will show the electric heater is on and the second lamp 36a will show the electric heater is off.

Figure 4:
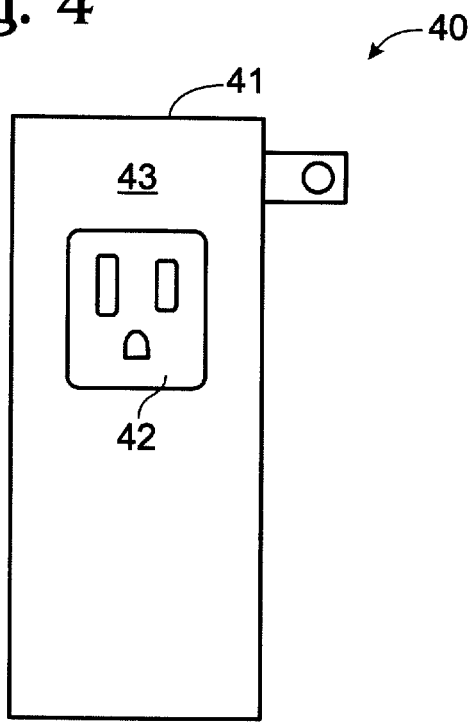
FIG. 4 shows the plug-load remote control node.

In FIG. 4, apparatus 40 is a plug-load remote control node. The box 41 is a molded plug-in outlet with 120/240 VAC female receptacle 42. Cord-and-plug powered heating, ventilation, and air conditioning equipment can be plugged into the receptacle 42, such as a window air conditioner, fan, or space heater. Functionally, the plug-load remote control node 43 follows the architectural format as shown in FIG. 3.

In FIG. 5, apparatus 50 is a hydronic heat remote control node. The construction is a small ABS junction box 51. It contains a wireless data transceiver 52, a rectified and regulated power supply 53, electric switching element 60, a memory module 58, a microprocessor IC 59, and pigtail flying leads 61a, 61b, 61c, 61d, 61e and 61f for wire-nut connection. Indicator lamps show the status of the apparatus 50 in connection with the wireless thermostat. For example, a first indicator lamp 56 will show the electric heater is on and a second indicator lamp 55 will show the electric heater is off. Also, a third indicator lamp 57 shows which electric switching element is energized. The hydronic system control remote control node allows thermostatic zone control capability in buildings with hydronic or steam heat. The remote control node has two electric switching elements to drive flow valve solenoids.

In FIG. 6, apparatus 70 is a gas baseboard space heat remote control node. The construction is a small ABS junction box 71. It contains a wireless data transceiver 72, a 24 VAC control voltage power supply 73, electric switching elements 76, a memory module 77, a microprocessor IC 75, and terminal block connections 78a, 78b, 78c, 78d, 78e and 78f. Pushbutton 74 allows energizing more than one fan. A first indicator lamp 79a shows the status of the gas relay, a second indicator lamp 79b shows the status of the valve relay, and a third indicator lamp 79c shows the status of the fan relay.

In FIG. 7, apparatus 80 is a packaged terminal air conditioner remote control node. The construction is a small ABS junction box 81. It contains a wireless data transceiver 82, a 24 VAC control voltage power supply 83, electric switching elements 90, a memory module 88, a microprocessor IC 89, and terminal block connections 87a, 87b, 87c, 87d, 87e, 87f, 87g and 87h. The pushbutton 84 allows energizing more than one fan. A first indicator lamp 85 shows the status of the fan relays, while a second indicator lamp 86 shows the air conditioner status, and a third indicator lamp 91 shows the heater status. The electric switching element 90 controls the compressor and electric resistance heating elements. A practitioner in the art will readily understand that electric switching elements 90 control reversing solenoids in the case of a heat pump.

Figure 8:
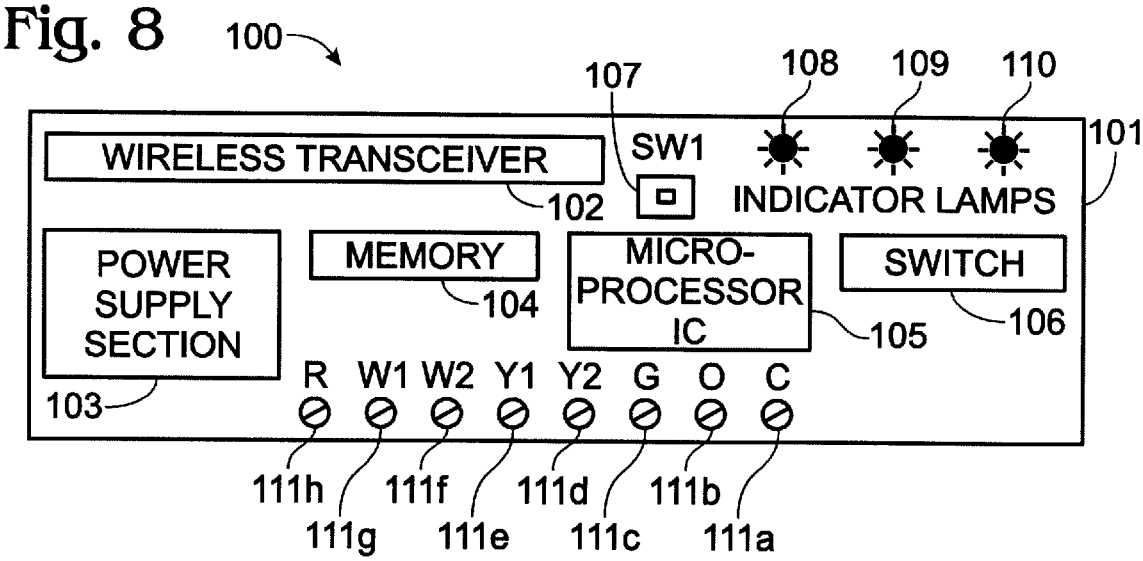
FIG. 8 shows a thermostat image remote control node.

In FIG. 8, apparatus 100 is a thermostat image remote control node. The construction is a small ABS junction box 101. It contains a wireless data transceiver 102, a 24 VAC control voltage power supply 103, electric switching elements 106, a memory module 104, a microprocessor IC 105, and screw terminal block connections 111a, 111b, 111c, 111d, 111e, 111f, 111g and 111h. The push button 107 allows energizing more than one fan. A first indicator lamp 108 shows the status of the fan relays, while a second indicator lamp 109 shows the air conditioner status, and a third indicator lamp 110 shows the heater status. A thermostat image remote control node provides a way to correct a poorly located existing thermostat by installation at the existing thermostat location. The wireless thermostat is then located in a more appropriate area.

Now referring back to FIG. 1, the wireless thermostat transceiver 26 is a low-power application specific integrated circuit (ASIC). For example, a RF transceiver, produced by Monolithics, Inc., operates on an unlicensed 916.5 MHz frequency. The effective communications range is about several hundred feet that depends upon location and interference. The transmission range of this transceiver is proportional to signal strength and inversely proportional to noise and interference. The wireless thermostat and remote control nodes use the same frequency channel for communications and rely on the robust communication protocol implemented by the communications protocol 20 to maintain communications between the installed units. A practitioner in the art can readily identify that differing wireless frequency channels or emission characteristics will provide a variety of wireless transmission characteristics depending upon the desired application by the user.

The input to the transmitter module of the wireless transceiver 26 in the wireless thermostat apparatus 22 is a dedicated pin on the CP 17 that produces a bit stream, optimized for the transceiver application specific integrated circuit (ASIC). The output of the transmitter portion is an amplitude-shift-keyed radio frequency waveform, modulation classification 20K0A1D, whose RF pattern corresponds to the data stream from the CP 17. However, other output modes include spread-spectrum and frequency modulation waveforms. Nevertheless, several subsidiary components in the RF circuit and a dedicated control pin from the CP 17 provide receiver gain control that prevents receiver overloading. This transmitter output is about ½ milliwatt that in combination with the antenna results in a radiated field strength that complies with FCC part 15 regulations. The receiver section is an amplitude-sequence-hybrid circuit that uses switching technology to amplify the weak signal received from the antenna in order to produce a useable binary data bit stream. The signal is then connected to a dedicated pin on the CP.

The antenna is a ¼ wavelength, loaded, monopole element that is constructed from a piece of enameled wire. To achieve optimum range, the thermostat and remote control node antennas are oriented in the same physical plane.

The physical environment has a great impact on the transmission range of the wireless thermostat system 10. Although several commonly accepted math formulas attempt to predict communication range, the specific environments make such generalizations unrealistic. For example, the furnace in the basement can act as a signal reflector and create an interference pattern that enhances or diminishes range depending on the reflection angle of the transmission signal. Common building materials can act as dielectrics and absorb RF energy. An active environment with moving objects redirects the transmission signal. The wireless thermostat system 10 as shown in FIG. 1 incorporates logic and control algorithms 25 that correct varying communication performance.

Figure 9:
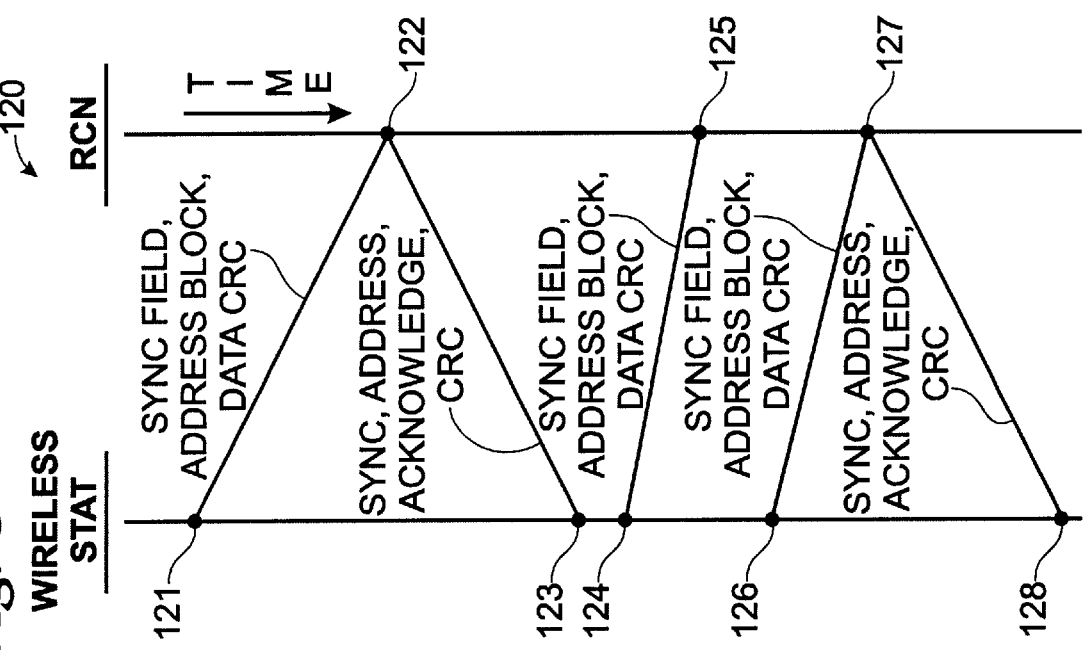
FIG. 9 shows a typical packet communications sequence.

The diagram in FIG. 9 shows communications sequence 120, where vertical lines represent the wireless thermostat and RCN, respectively, and are referred to as "nodes" in the network. Time is represented in the vertical direction. Also, the arrows flowing back and forth between the nodes represent data traffic messages. This diagram shows a typical data communications sequence 120. At position 121 the wireless thermostat awakens and sends a temperature signal to a remote control node. The RF transceiver listens for a clear channel before sending to position 122. The RCN decodes the message, determines that the message is addressed to it, compares the transmitted error detection and recovery data with its own calculated error detection and recovery data, accepts the data, and then sends an acknowledgement. At position 123 the wireless thermostat receives acknowledgement from the remote control node. In another sequence, at position 124, the thermostat sends a temperature message to the RCN. The RCN misses the thermostat transmission at position 125. Consequently, at position 126 the thermostat's transmission timer expires because there was no response from the RCN. Sequentially, at position 126, after the transmission timer expires transmission of the temperature signal is re-initiated. This time at position 127 the RCN hears and acknowledges the second transmission. Finally, at position 128, the thermostat receives acknowledgement from the RCN.

Data traffic messages synchronize and validate data base elements, for example, space temperature, between the thermostat and remote control node. Each node is then free to execute its control algorithm presuming correct and complete data. Typical actions that initiate communications are: user update of temperature, set point, heating, or cooling mode; change of space temperature; update of thermostat real-time clock; and load control command from an electric utility. There are several levels of data traffic within the thermostat design; communication between microprocessors, UIP and CP, CP and RF module, thermostat RF module and RCN RF module and/or RCN CP.

The robustness of the communications link between the thermostat and the RCN(s) depends primarily on the packet communications protocol inherent in the CP and upon protocol and safety enhancements within the control algorithm. The RF transceiver modules relay signals that are heard including desired control signals, other thermostat/RCN data traffic, and are subject to unrelated devices operating on the same frequency, and spurious electrical interference. There are two automated hardware sub-processors resident in the CP. They are dedicated to the accurate orderly transfer of data over potentially noisy and shared communication channels. Finally, the control network protocol used by the CP is the industry standard ANSI/EIA 709.1-A-1999.

FIG. 10 shows a block diagram of interprocessor communications scenario 130. The CP 131 receives one often possible commands from UIP 136. The command and associate data is delivered, through RF transceiver 132, and RF transceiver 133, to the microprocessor 135 of RCN 134. The response from the RCN 134 is an acknowledgement including confirmation of the received data and RCN status. Consequently, the CP 131 responds to UIP 136 with this information or with an error message if there is no response from the RCN 134. If the response from the CP 131 is acceptable, then the UIP will send a sleep command to the CP 131 and look for a response. If the CP 131 goes to sleep, then the UIP will set an alarm timer and then sleep. When the UIP does wakeup through the alarm timer or user interface control panel pushbutton, the UIP then updates its clock. When one minute has elapsed, the UIP will read the current temperature. If the temperature change is significant or if a heartbeat communications timer expires, the UIP will wake CP 131. Also, if it is not time for a temperature reading then the CP 131 goes back to sleep. However, for communication sequence 130 to operate the user must initiate a binding process instructing the wireless thermostat and all associated RCNs to interact with each other upon initial apparatus installation.

Figure 11:
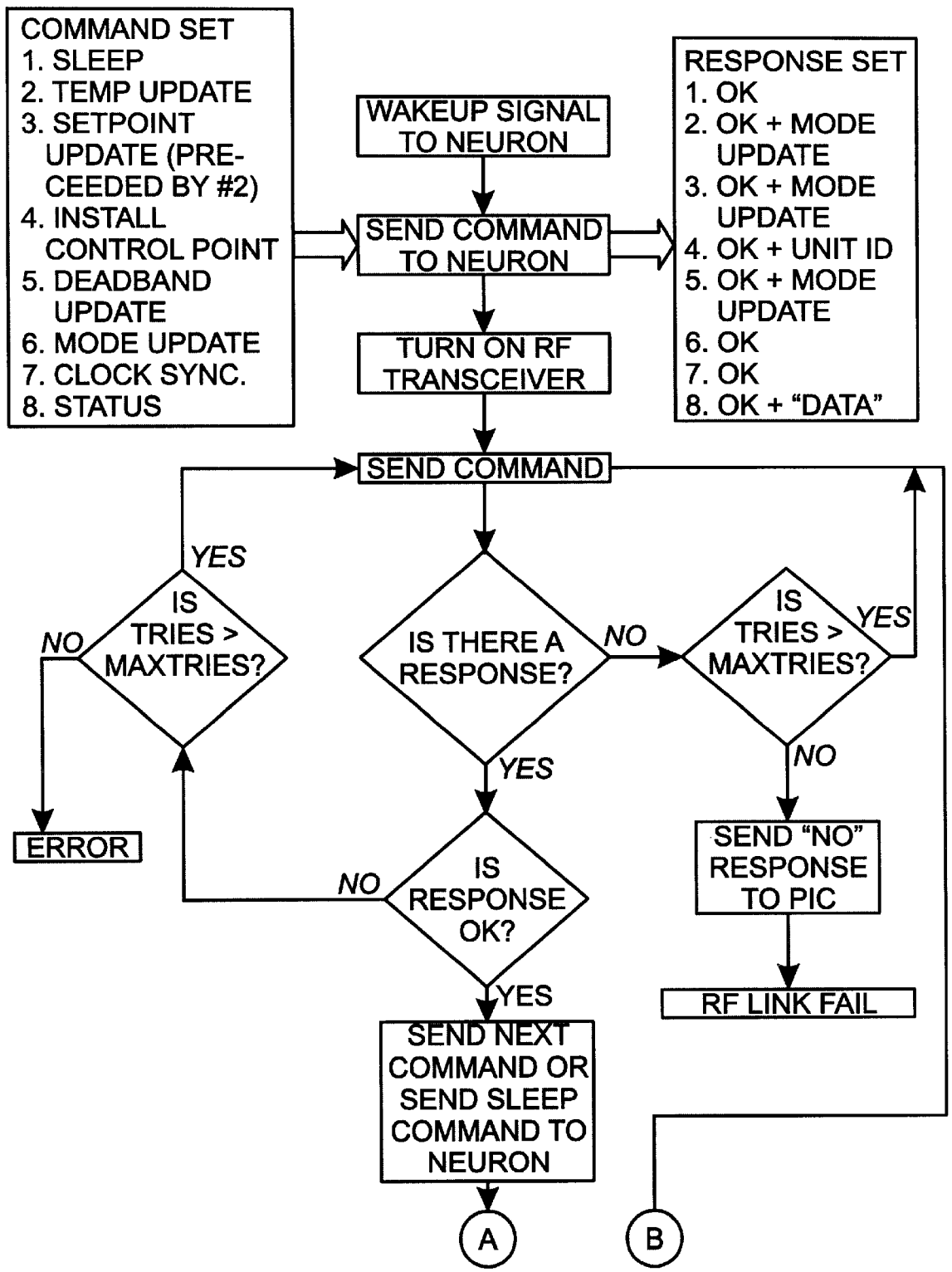
FIG. 11 is a flow chart of the communications software.
Figure 11B:
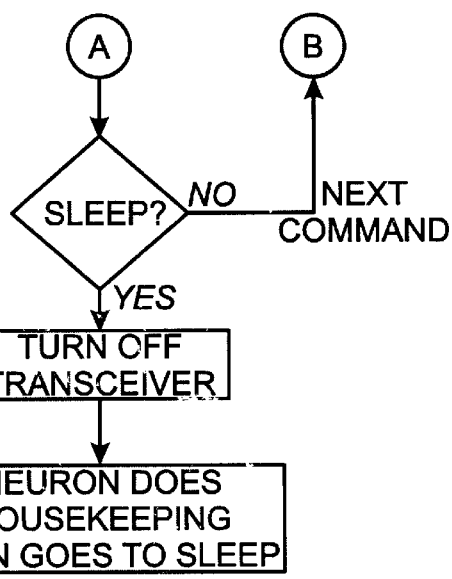

FIGS. 11 and 11B shows flowchart 140 that is the logic related to the communications sequence 130 as shown on FIG. 10.

Figure 12:
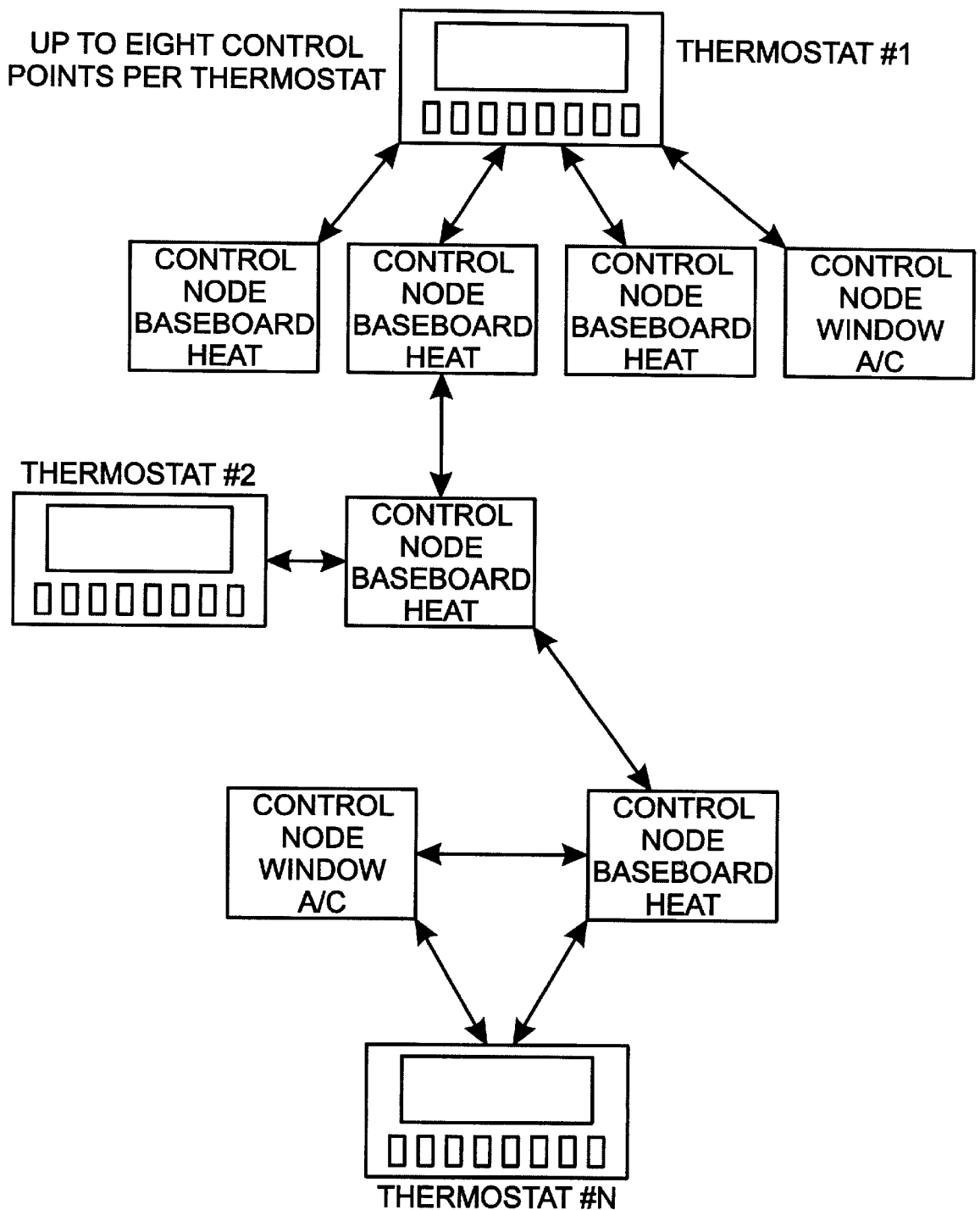
FIG. 12 is a block diagram of a building area network.

An important embodiment of the wireless thermostat system is the automatic establishment of a Building Area Network via a store and forward repeater protocol. As shown in FIG. 12, each remote control node (RCN) is programmed with the inherent ability to store certain incoming data traffic messages and forward them to other RCNs and thermostats, and eliminate range restrictions as found in low power wireless environments. The communications are relayed within a given linked thermostat/RCN, for example, an apartment, and between systems that provides whole-building coverage at no additional cost.

Communications protocol are available to adapt for controlling pressure, flow, rate, electric, light, sound, vibration, velocity, acceleration, density, consistency, and other applications, at industrial plants and various industrial applications. For example, a wireless data transceiver pressure sensor will transmit to and be received by a receiver control node adapted to a pressure relief valve allowing it to open if a sensed pressure increases above a set point pressure. The same architecture, as shown in FIG. 3 would be used for the pressure relief valve RCN, except adapted to operate a solenoid valve to open the pressure relief valve when sensed pressure exceeds set point pressure.

One obvious use of a store and forward messaging protocol, is to relay thermostat control and data messages during periods of external RF interference, for example, from cordless telephones. Another use is the aggregation of building energy profiles to alert owners of heating, ventilation, or air conditioning problems. Also, this protocol is practical for utility control.

The store and forward messaging protocol, uses a message number and time stamp for each data traffic message. Every RCN that receives a message to forward examines its database of messages for an existing copy. If the message is new, that is, does not match in content, time stamp, and content, the RCN repeats the message once. If the message is old, that is, the RCN has heard it before, the RCN does not repeat the message. When the message time stamp expires, the RCN discards the message. RCN firmware protocol provides timing parameter variations for reducing network traffic congestion, and preventing infinite repeat of the messages. Furthermore, stand-alone store-and-forward repeaters containing the protocol can be located in areas with sparse distribution of RCN units to establish a reliable network. A practitioner in the art understands that other protocols and variations are available for messaging.

Figure 13:
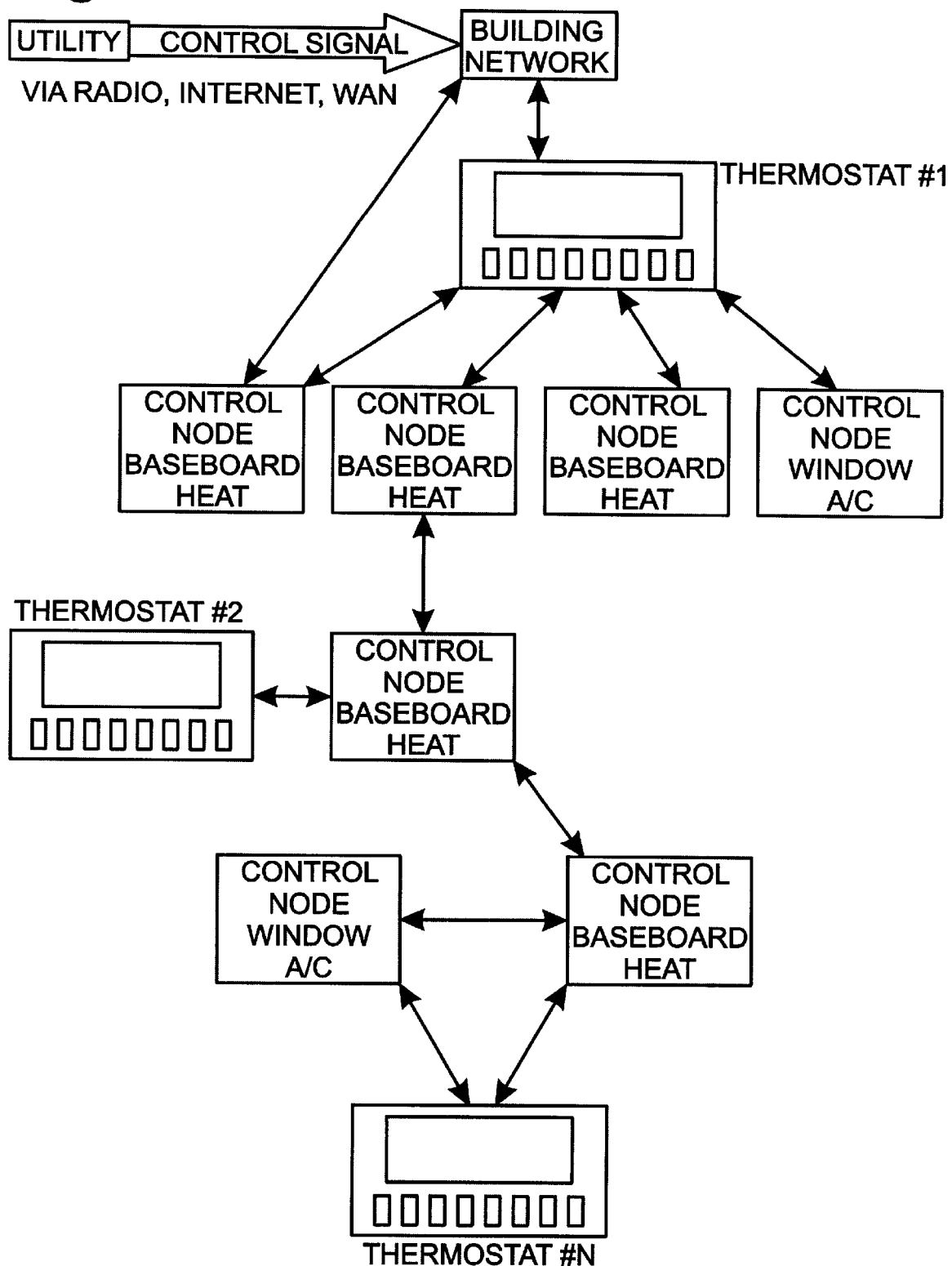
FIG. 13 is a block diagram for utility control.

The building area network, as shown in FIG. 12, comprised of thermostats and RCNs allow electric utility control and monitoring of individual heating, ventilation and air conditioning loads for load shedding, real-time pricing, and prepaid billing. FIG. 13 shows utility control 150 as applied in building area networks. Some utilities load shed through one-way radio networks during peak electric usage. Moreover, existing control hardware is prone to tampering, and by its one-way nature, fails to confirm whether the desired load shedding has been implemented. On the other hand, building area networks using store and forward messaging or ANSI/EIA 709.1-A-1999 protocols eliminates the deficiencies in one-way communication and provides the utility with confirmed utility control. Gateway interfaces are easily implemented that bridge load-control commands in pre-existing utility load-control infrastructure, such as the national two-way pager networks to building area network environments.

A new load curtailment program possible within the wireless thermostat apparatus 10, as shown in FIG. 1, is a shared savings based program. The wireless thermostat apparatus 10 has the ability to display to the user a variety of data including the display of dollar amounts. Furthermore, the store and forward protocols allow changes to the wireless thermostat providing an RF device to sense and control pressure, flow, rate and volume. For example, the Independent System Operators manage the buying and distribution of power within a State, and tracks energy costs. Within the wireless thermostat apparatus 10, and the building area network environment, a percentage of the avoided cost value of a load control period combined with the approximate kW value of another load under control, produces a shared cost avoidance contribution of a single direct load control participant. The dollar value equated to the specific load under control for each load control event is accumulated over a defined period that allows the savings to build.

Figure 14B:
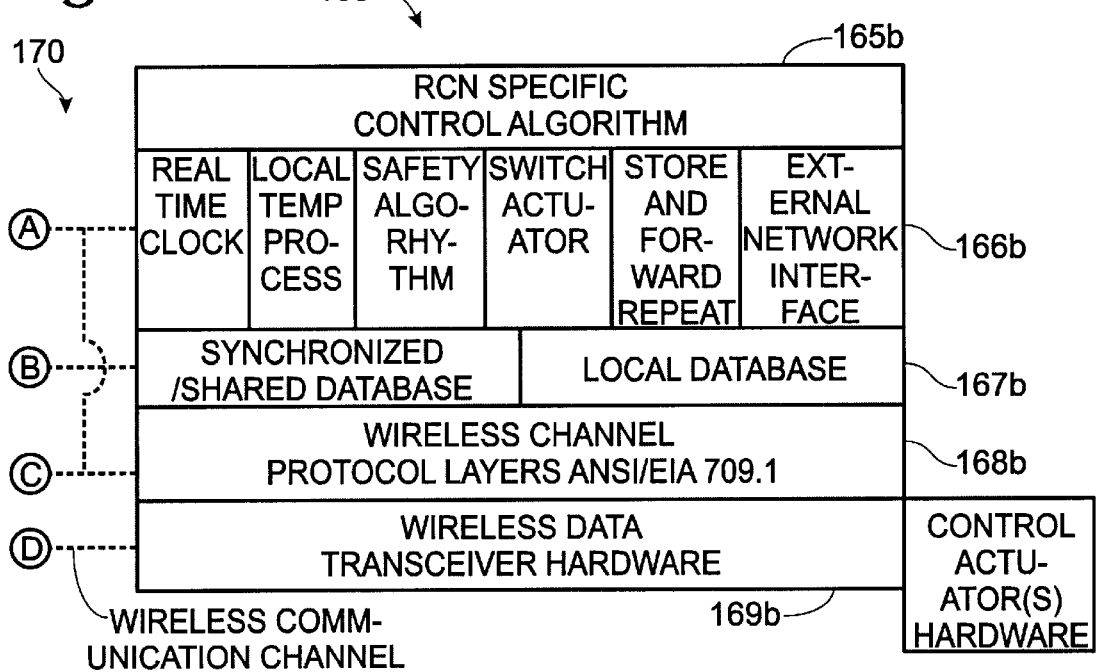
FIG. 14 is a diagram of the user interprocessor software architecture.
Figure 14A:
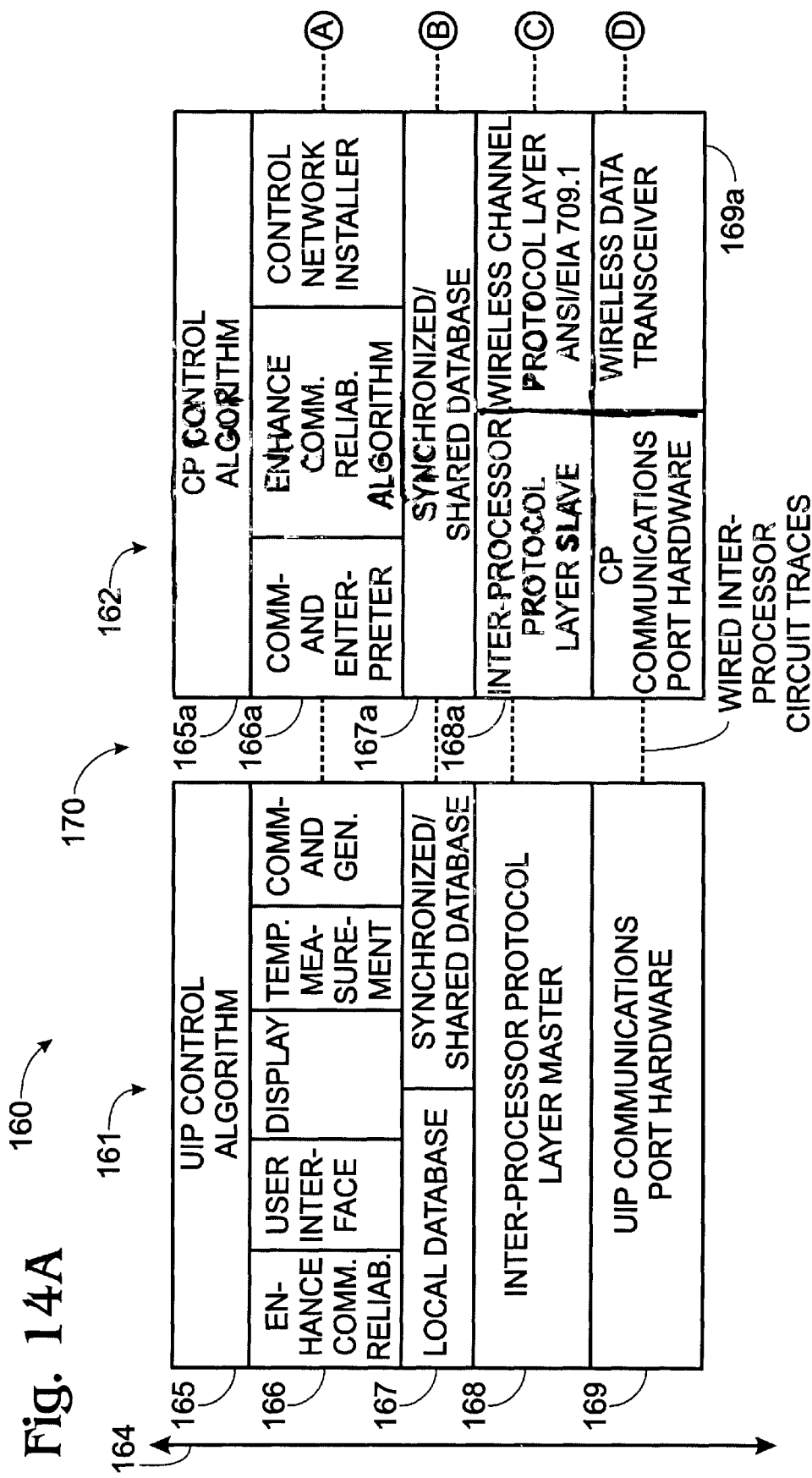

FIGS. 14A and 14B is a logic diagram 160 of the control algorithms used in the wireless thermostat system 10 from FIG. 1. It shows the structure of software executing on the various microprocessors within the thermostat system to create a multiprocessor environment. The first software structure 161 executes the wireless thermostat UIP processor, the second software structure 162 executes the wireless thermostat CP processor, and the third software structure 163 executes the RCN processor.

The first software structure 161 has a five layer architecture. The control algorithm is the first layer 165. The second layer 166 includes written instruction code to enhance communication reliability, to operate the user interface and display, to take measurements, and to generate the proper commands to operate the system. The third layer 167 includes written code to retrieve from the local data base and synchronized/shared data base. The fourth layer 168 includes code to access the interprocessor protocol layer (master). The fifth layer 169 includes UIP hardware communications circuitry.

The second software structure 162 has a five layer architecture. The control algorithm is the first layer 165a. The second layer 166a includes written instruction code to enhance communication reliability, to interpret commands from the UIP, and to control network installer. The third layer 167a includes written code to retrieve data from the synchronized/shared data base. The fourth layer 168a includes instruction to access the interprocessor protocol layer (slave). The fifth layer 169a includes CP hardware communications circuitry and wireless data transceiver circuitry.

The control algorithm is specific for each type of RCN. The third software structure 163 has a five layer architecture, and the control algorithm is the first layer 165b. The second layer 166b includes written instruction code to operate the real time clock, local temperature process, switch actuator, store and forward repeat, external network interface, and safety algorithm. The third layer 167b includes instruction code to access the synchronized/shared data base and the local data base. The fourth layer 168b includes instruction to operate the wireless channel protocol layers. The fifth layer 169b includes wireless communications circuitry and communications circuitry for command control actuator(s).

As can be seen in FIGS. 14(A & B), the communication link between the UIP and CP is hard wire, while the communication link between the CP and RCN is wireless. Each structure is in virtual communication 170 through hardware communication circuitry 169 residing within the thermostat apparatus.

The vertical axis 164 in an upward direction indicates an increasing level of software complexity of apparatus 10 as shown in FIG. 1. Generally, each layer provides data or support to the layer above it and requires service from the layer below it. The first layer 165, 165a, and 165b, represents the highest-level control algorithm. The second layer 166 of the first software structure 161 represents UIP software which handles user interface, display, temperature measurement, command generation control of the CP, and provision for enhanced wireless link reliability. The second layer 166a of the second software structure 162 represents the command interpreter for executing UIP commands, and enhanced wireless link reliability algorithm, and a network installer used to bind a thermostat to its many associated RCN(s). The second layer 166b of the third software structure 163 represents a local real time clock, local temperature measurement, safety control, and control switch actuator. The third layer 167, 167a, and 167b are a distributed data base containing information needed to run the control algorithm 165, 165a, and 165b that includes temperatures, time stamps, control algorithm constants, user program, and provides interface to an external network. The fourth layer 168, 168a, and 168b contains routines that effect robust and accurate communications between and among the first software structure 161, second software structure 162 and the third software structure 163. Furthermore, the third software structure 163 could be executed simultaneously on a plurality of RCNs.

While there has been illustrated and described what is a present considered to be a preferred embodiment of the claimed invention, it will be appreciated that numerous changes and modifications are likely to occur to those skilled in the art. It is intended in the appended claims to cover all those changes and modifications that fall within the spirit and scope of the claimed invention.

What is claimed is:

1. A control apparatus comprising:
   a) a power supply for providing appropriate current and voltage to modules of the control apparatus;
   b) a user interface microprocessor module for providing the necessary architecture to handle user inputs as well as programmable control logic;
   c) a communications microprocessor module for processing data traffic signals among said control apparatus modules;
   d) a transceiver module for transmitting and receiving wireless data traffic signals; and
   e) one or more remote control node module(s) with a microprocessor and transceiver for sending, receiving and acting upon wireless traffic signals to control an operation, said remote control node module(s) capable of performing a store and forward repeater function.

2. The control apparatus as claimed in claim 1, wherein said operation is a plurality of control schemes.

3. The control apparatus as claimed in claim 2, wherein said control schemes are selected from the group consisting of temperature, flow, pressure, volume, rate, magnetic, proximity, light, sound, vibration, density, and electrical.

4. The control apparatus as claimed in claim 1, wherein said remote control node module is used with a plurality of devices.

5. The control apparatus as claimed in claim 1, wherein said remote control node module is used with HVAC equipment selected from the group consisting of baseboard electric heat, hydronic valves, window air conditioning packages, packaged terminal air conditioners, fans, heat pumps, actuators, solenoid valves, and control valves.

6. The control apparatus as claimed in claim 1, wherein said power supply is a plurality of sources.

7. The control apparatus as claimed in claim 1, wherein said remote control node module(s) microprocessor and transceiver are also for sending, receiving and acting upon communications network signals to control an operation.

8. The control apparatus as claimed in claim 7, wherein said communications network signals are transmitted over a communications network medium selected from the group consisting of Power-Line-Carrier (PLC), twisted pair, local area network (LAN), and wide area network (WAN).

9. The control apparatus as claimed in claim 8, wherein said WAN is selected from the group consisting of optical fiber, telephone, radio, and microwave.

10. The control apparatus as claimed in claim 1, wherein the user interface microprocessor further comprises a display driver, a real time clock, a control panel interface, a measurement integrated circuit, a first communications protocol, and a control algorithm.

11. The control apparatus as claimed in claim 10, wherein said measurement integrated circuit further comprises a sensor that determines a plurality of measurements.

12. The control apparatus as claimed in claim 10, wherein said control panel interface is an IC serial interfaced with a display and input capability.

13. The control apparatus as claimed in claim 11, wherein said sensor is a thermostat, for temperature measurement, and further consists of an IC serial interface.

14. The control apparatus as claimed in claim 12, wherein said display and input capability is selected from the group consisting of temperature, clock, present space temperature, temperature set point, temperature adjustment, temperature increment, set back temperature, sleep mode, calendar, mode status, fan status, stage, preprogram select, program period, power, and calendar.

15. The control apparatus as claimed in claim 13, wherein said display is selected from the group consisting of liquid crystal, touch screen, and CRT monitor.

16. The control apparatus as claimed in claim 13, said control panel interface further comprises thermostat data input pushbuttons that are selected from the group consisting of clock set, program, setup, enter, up, down, network, and fan.

17. The control apparatus as claimed in claim 10, wherein said clock is a real-time clock IC that permits said thermostat to have programmable schedules.

18. The control apparatus as claimed in claim 17, wherein said clock is a real-time clock IC crystal may be a plurality of crystals depending upon the accuracy desired.

19. The control apparatus as claimed in claim 10, wherein said display driver is used to drive displays that are selected from the group consisting of a LCD, a touch screen, and a CRT.

20. The control apparatus as claimed in claim 1, wherein said user interface processor module issues commands to said communications processor module.

21. The control apparatus as claimed in claim 20, wherein said commands are selected from the group consisting of waking, powering, supervising, and data transfer.

22. The control apparatus as claimed in claim 1, wherein said communications microprocessor (CP) and said user interface microprocessor (UIP) use a first communications protocol to communicate between the CP module and UIP module, and a second communications protocol to communicate between the CP module and remote control node (RCN) module.

23. The control apparatus as claimed in claim 22, wherein said first communications protocol consists of a physical layer protocol compatible with the industry standard.

24. The control apparatus as claimed in claim 1, wherein said user interface microprocessor provides signals to said communications microprocessor to reduce power consumption.

25. The control apparatus as claimed in claim 1, wherein a remote control node device is selected from the group consisting of RCN Baseboard Electric Heater, RCN Plug-Load, RCN Hydronic Heater, RCN Space Heater, RCN Gas Heater, RCN Packaged Terminal Air Conditioner, and RCN Thermostat Image.

26. The control apparatus as claimed in claim 1, wherein said power supply is a plurality of voltages and currents.

27. The control apparatus as claimed in claim 1, wherein said remote control node module communicates through router nodes that allow wireless network data traffic to be routed on and off the network communications medium.

28. The control apparatus as claimed in claim 27, wherein said router nodes communicate through other media selected from the group consisting of optics, acoustics, a power line carrier, a twisted-pair, and RS485.

29. The control apparatus as claimed in claim 1, wherein said wireless communication uses a RF transceiver module.

30. The control apparatus as claimed in claim 29, wherein the input to said transceiver module is a dedicated pin on the communications microprocessor that produces a binary coded bit stream optimized for the transceiver combination.

31. The control apparatus as claimed in claim 30, wherein the output of the transmitter of said combination whose RF pattern corresponds to the data stream from said communications microprocessor is a plurality of modes.

32. The control apparatus as claimed in claim 30, wherein the RF transceiver of said combination is plurality of circuits that use switching technology to amplify weak signals, from an antenna, and produces a useable binary data bit stream.

33. The control apparatus as claimed in claim 1, wherein said CP module and said remote control node module bind with each other through setup pushbutton control.

34. The control apparatus as claimed in claim 1, wherein said remote control node module further comprises a store and forward messaging protocol.

35. The control apparatus as claimed is claim 34, wherein said store and forward messaging protocol can be programmed to relay a signal to and from a transceiver that is beyond the effective range of the transceiver of said module, allowing communication within a single building and between a plurality of buildings.

36. The control apparatus as claimed in claim 34, wherein said store and forward messaging protocol is programmed to reduce energy use in a plurality of applications.

37. The control apparatus as claimed in claim 34, wherein said store and forward messaging protocol is further relayed to communicate with remote control node modules by standalone store-and-forward repeaters.

38. The control apparatus as claimed in claim 34, wherein said store and forward messaging protocol reduces message repetition through a message number and time stamp.

39. The control apparatus as claimed in claim 1, wherein said user interface microprocessor further comprises a load curtailment program that allows energy use reduction in a plurality of applications.

40. A method of operating a control apparatus, comprising:
   a) energizing a power supply for providing appropriate current and voltage to modules of the control apparatus;
   b) interacting with a user interface microprocessor module that provides the necessary architecture to handle user inputs as well as user-programmable control logic;
   c) commanding a communications microprocessor module for providing data traffic signals among remote control node modules, said remote control node modules capable of performing a store and forward repeater function;
   d) exchanging data from a transceiver for communicating wireless data traffic signals; and
   e) executing an algorithm in a multi-processor environment to control an operation.

41. The method of operating a control apparatus as claimed in claim 40, wherein said operation is a plurality of control schemes.

42. The method of operating a control apparatus as claimed in claim 41, wherein said control schemes are selected from the group consisting of temperature, flow, pressure, volume, rate, magnetic, proximity, light, sound, vibration, density, and electrical.

43. The method of operating a control apparatus as claimed in claim 40, wherein said remote control node module is used with HVAC equipment selected from the group consisting of baseboard electric heat, hydronic valves, window air conditioning packages, packaged terminal air conditioners, fans, heat pumps, solenoid valves, and control valves.

44. The method of operating a control apparatus as claimed in claim 40, wherein said transceiver is also for communicating communications network signals.

45. The method of operating a control apparatus as claimed in claim 44, wherein said communications network signals are transmitted over a communications network medium is selected from the group consisting of Power-Line-Carrier (PLC), twisted pair, local area network (LAN), and wide area network (WAN).

46. The method of operating a control apparatus as claimed in claim 45, wherein said WAN is selected from the group consisting of optical fiber telephone, radio, and microwave.

47. The method of operating a control apparatus as claimed in claim 40, wherein said user interface microprocessor further comprises display driver, a real time clock, a control panel interface, a measurement integrated circuit, a first communications protocol, and a control algorithm.

48. The method of operating a control apparatus as claimed in claim 47, wherein said measurement integrated circuit further comprises a sensor that determines a plurality of measurements.

49. The method of operating a control apparatus as claimed in claim 48, wherein said sensor is a thermostat, for temperature measurement, and further consists of an IC serial interface.

50. The method of operating a control apparatus as claimed in claim 47, wherein said control panel interface is an IC serial interfaced with a display and input capability.

51. The method of operating a control apparatus as claimed in claim 50, wherein said display and input capability is selected from the group consisting of temperature, clock, present space temperature, temperature set point, temperature adjustment, temperature increment, set back temperature, sleep mode, calendar, mode status, fan status, stage, preprogram select, program period, power, and calendar.

52. The method of operating a control apparatus as claimed in claim 50, wherein said display is selected from the group consisting of liquid crystal, touch screen, and CRT monitor.

53. The method of operating a control apparatus as claimed in claim 50, wherein said control panel interface further comprises thermostat data input pushbuttons that are selected from the group consisting of clock set, program, setup, enter, up, down, network, and fan.

54. The method of operating a control apparatus as claimed in claim 47, wherein said clock is a real-time clock IC that permits said thermostat to have programmable schedules.

55. The method of operating a control apparatus as claimed in claim 54, wherein said clock is a real-time clock IC crystal may be a plurality of crystals depending upon the accuracy desired.

56. The method of operating a control apparatus as claimed in claim 47, wherein said display driver is used to drive displays that are selected from the group consisting of a LCD, a touch screen, and a CRT.

57. The method of operating a control apparatus as claimed in claim 40, wherein said user interface processor module issues commands to said communications processor module.

58. The method of operating a control apparatus as claimed in claim 57, wherein said commands are selected from the group consisting of waking, powering, supervising, and data transfer.

59. The method of operating a control apparatus as claimed in claim 40, wherein said communications microprocessor (CP) and said user interface microprocessor (UIP) use a first communications protocol to communicate between the CP module and UIP module, and a second communications protocol to communicate between the CP module and remote control node (RCN) module.

60. The method of operating a control apparatus as claimed in claim 59, wherein said first communications protocol consists of physical layer protocol compatible with the industry standard.

61. The method of operating a control apparatus as claimed in claim 40, wherein said user interface microprocessor provides signals to said communications microprocessor to reduce power consumption.

62. The method of operating a control apparatus as claimed in claim 40, wherein a remote control node device is selected from the group consisting of RCN Baseboard Electric Heater, RCN Plug-Load, RCN Hydronic Heater, RCN Space Heater, RCN Gas Heater, RCN Packaged Terminal Air Conditioner, and RCN Thermostat image.

63. The method of operating control apparatus as claimed in claim 40, wherein said power supply is a plurality of voltages and currents.

64. The method of operating a control apparatus as claimed in claim 40, wherein said remote control node communicates through router nodes that allow wireless network data traffic to be routed on and off the network communications medium.

65. The method of operating a control apparatus as claimed in claim 64, wherein said router nodes communicate through other medium selected from the group consisting of optics, acoustics, a power line carrier, a twisted-pair, and RS485.

66. The method of operating a control apparatus as claimed in claim 40, wherein said wireless communication uses a RF transceiver module.

67. The method of operating a control apparatus as claimed in claim 66, wherein the input to said transceiver module is a dedicated pin on the communications microprocessor that produces a binary coded bit stream optimized for the transceiver combination.

68. The method of operating a control apparatus as claimed in claim 67, wherein the output of the transmitter of said combination whose RF pattern corresponds to the data stream from said communications microprocessor is a plurality of modes.

69. The method of operating a control apparatus as claimed claim 67, wherein the transceiver of said combination is a plurality of circuits that uses switching technology to amplify weak signals, from an antenna, and procedures a useable binary data bit stream.

70. The method of operating a control apparatus as claimed in claim 40, wherein said communication processor module and said remote control node module bind with each other through setup pushbutton control.

71. The method of operating a control apparatus as claimed in claim 40, wherein said remote control node module further comprises a store and forward messaging protocol.

72. The method of operating a control apparatus as claimed in claim 71, wherein said store and forward messaging protocol can be programmed to relay a signal to and from a transceiver that is beyond the range of the transceiver of said module, allowing communication within a single building and between a plurality of buildings.

73. The method of operating a control apparatus as claimed in claim 71, wherein said store and forward messaging protocol is programmed to reduce energy use in a plurality of applications.

74. The method of operating a control apparatus as claimed in claim 71, wherein said store and forward messaging protocol is further relayed to communicate with remote control node modules by standalone store-and-forward repeaters.

75. The method of operating a control apparatus as claimed in claim 71, wherein said store and forward messaging protocol reduces message repetition through a message number and time stamp.

76. The method of operating a control apparatus as claimed in claim 40, wherein said user interface microprocessor module further comprises a load curtailment program that allows energy use reduction in a plurality of applications.

* * * * *